United States Patent [15] 3,643,236

Kolankowsky et al. [45] Feb. 15, 1972

[54] STORAGE HAVING A PLURALITY OF SIMULTANEOUSLY ACCESSIBLE LOCATIONS

[72] Inventors: Eugene Kolankowsky, Pleasant Valley; Robert F. McMahon, Poughkeepsie; David J. Perlman, Wappingers Falls, all of N.Y.

[73] Assignee: International Business Machines Corporation, Armonk, N.Y.

[22] Filed: Dec. 19, 1969

[21] Appl. No.: 886,511

[52] U.S. Cl. ..............340/173 R, 340/173 AM, 340/173 FF, 340/174 M

[51] Int. Cl. ..........................................................G11c 15/00

[58] Field of Search ..........340/174 R, 174 M, 173 R, 173 FF

[56] References Cited

UNITED STATES PATENTS

| | | | |
|---|---|---|---|
| 2,813,260 | 11/1957 | Kaplan | 340/174 |
| 3,292,008 | 12/1966 | Rapp | 340/173 |
| 3,363,115 | 1/1968 | Stephenson et al. | 340/173 |
| 3,548,388 | 12/1970 | Sonoda | 340/173 |

*Primary Examiner*—Terrell W. Fears
*Attorney*—Hanifin and Jancin and Gunter A. Hauptman

[57] ABSTRACT

In a storage array wherein several locations are simultaneously accessed, each location includes a circuit settable to one of two conditions by signals on lines defining its position. Defining the storage position by three lines, "horizontal," "vertical" and "diagonal," each circuit may be selected by activating its diagonal line and either the horizontal or vertical line for that circuit. The storage cell is a solid-stage flip-flop with two cross-coupled active devices and additional active device for each of the three driving lines. Connections to each circuit through selected ones of the vertical and horizontal lines communicate information on the inactivated line.

6 Claims, 23 Drawing Figures

FIG. 1

INVENTORS
EUGENE KOLANKOWSKY
ROBERT F. McMAHON
DAVID J. PERLMAN
BY Gunter A. Hauptman
ATTORNEY

1 D DECODER 11

2 D DECODER 14

STORAGE HAVING A PLURALITY OF SIMULTANEOUSLY ACCESSIBLE LOCATIONS

CROSS-REFERENCES TO RELATED APPLICATIONS

While a solid-state embodiment of a storage unit for a data processing system is disclosed in this application, several embodiments of the data processing system, and a magnetic core embodiment of the storage unit for such a system, are disclosed in an application Ser. No. 886,508 of E. Kolankowsky et al., entitled "Data Processing System With A Storage Having A Plurality of Simultaneous Accessible Locations," filed on even date herewith and assigned to the International Business Machines Corporation and a semiconductive FET cell for the memory unit is disclosed in Ser. No. 886,509 of E. Kolankowsky, entitled "Semi-Conductive Cell For A Storage Having a Plurality of Simultaneously Accessible Locations," filed on even date herewith and assigned to the International Business Machines Corporation.

BACKGROUND OF THE INVENTION

1. Field of the Invention

This invention generally relates to electronic data processing systems having randomly accessible storages. More particularly, the invention pertains to storages for such systems having a plurality of simultaneously accessible locations and a preferred embodiment of such a storage.

2. Description of the Prior Art

The cross-referenced patent application entitled "Data Processing System With A Storage Having A Plurality of Simultaneously Accessible Locations" (Docket PO–9–68–033) describes a system independently available for two or more simultaneously purposes because two or more storage locations may be simultaneously accessed. The preferred embodiment disclosed therein utilizes a single magnetic core for each bit of the storage array. Such a storage array may also utilize solid-state devices which, when made in quantity, are very inexpensive and, due to their small size, extremely fast.

An article by I. Catt et al. entitled "A High-Speed Integrated Circuit Scratch Pad Memory," published in the Proceedings of the Fall Joint Computer Conference, 1966, page 315, describes an integrated circuit storage permitting simultaneous access to more than one storage location. Each cell in the array has an integrated circuit for storing two bits. Thus, two superposed storages store the same information and may be simultaneously accessed.

SUMMARY OF THE INVENTION

A single solid-state storage holding one bit per cell allows simultaneous accessing of any two or more locations in the array. Each bit position or cell, comprises an integrated circuit latch and accessing circuitry arranged to permit any two latches to be simultaneously sensed and/or set. Each cell is defined by $n$ coordinates, the individual latches being uniquely selected, for nondestructive reading or for writing, by signals on lines coinciding with $n-1$ out of $n$ coordinates. Lines associated with the extra coordinate communicate information during reading and writing in selected cells. For example, if there are three coordinates H (horizontal), V (vertical) and D (diagonal), signals on the D coordinate line and on either of the H or V coordinate lines together access any given location and lines associated with the other one of the H or V coordinates sense the information in the location during a reading operation and enters it during writing. In the three-coordinate example, two locations may be simultaneously accessed: (a) if the two locations are in the same horizontal row, the H coordinate line for that row and the two D coordinate lines for the two accessed locations are selected and information is sensed or written via other lines associated with the two V coordinates; (b) if the accessed locations are in the same vertical column, the V coordinate line for that row and the D coordinate line for the accessed locations are selected and other lines associated with the H coordinate sense or enter information therein; and (c) if the locations are "diagonally" located, that is, they are not on the same row or column, then the diagonal coordinate line and the H coordinate lines defining the accessed locations are operated, other lines associated with the V coordinate sensing or entering information. Specific designations are a matter of choice and may be varied following the pattern inherent in cases (a) through (c).

In a typical multiaccess storage array, of solid-state latches, arranged in a three-dimensional array, each store one bit of a word. Each word has one bit in each plane, usually in corresponding positions. In each plane, the bits are accessed in accordance with the wiring of V, H and D driving lines corresponding to the V, H and D coordinates. Each V line is connected to the same column in every plane and each H line is connected to the same row in each plane. The diagonal driving lines connect the corresponding diagonals in the planes. Additional pairs of horizontal and vertical lines connect columns and rows to sense amplifiers and bit drivers. Addresses specified by two systems, each having a storage address register, are simultaneously decoded by H, V and D decoders which specify the H, V and D lines to be activated. The decoders select one diagonal line for each accessed word and either a horizontal or vertical line defining each accessed word. The two driving lines along two coordinates defining each accessed word (according to the above rules) are energized and the additional pair of lines associated with the third coordinate passing through each accessed word connects the word cells to a sense amplifier during reading or to a bit driving source during writing.

DESCRIPTION OF THE PREFERRED EMBODIMENT

GENERAL DESCRIPTION

Figure 1:
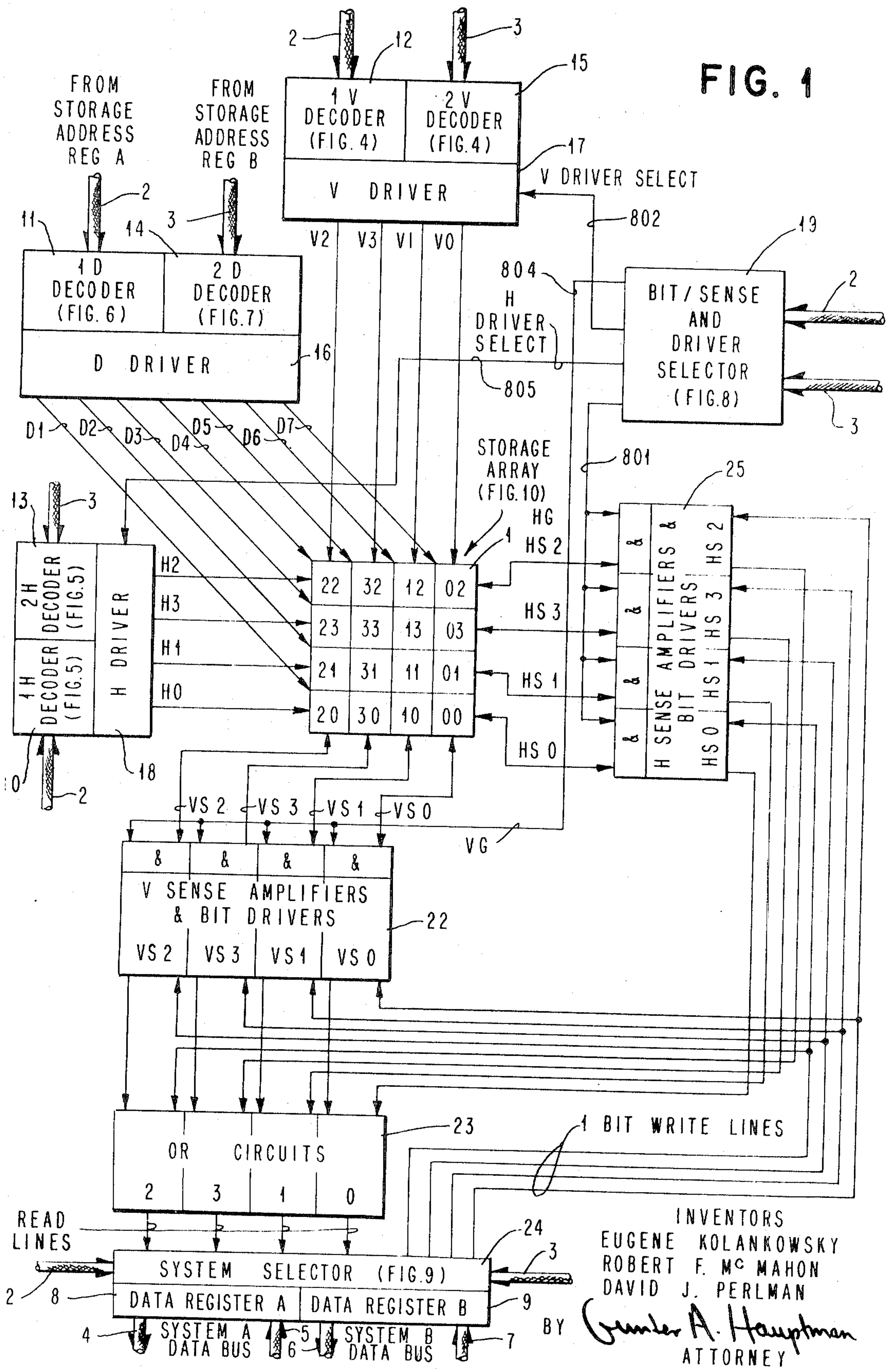
FIG. 1 is a block diagram showing a system utilizing the invention.

Referring to FIG. 1, the invention will first be generally described. The use of the invention in a data processing system is explained in the cross-referenced patent application, entitled "Data Processing System With A Storage Having A Plurality of Simultaneously Accessible Locations" (Docket PO–9–68–033). Two independent systems share the use of storage array 1 as though it were two separate storages. System A supplies addresses via bus 2 from a storage address register A and system B supplies addresses on bus 3 from storage address register B. Data is exchanged between system A and the storage array 1 via system A data buses 4 and 5.

Similarly, system B exchanges information with the storage array 1 via system B data buses 6 and 7. The information corresponding to the addresses on buses 2 and 3 are stored in data registers 8 and 9. Addresses received on system A bus 2 are decoded simultaneously by H decoder 10, D decoder 11 and V decoder 12 and addresses received on system B bus 3 are decoded simultaneously by H decoder 13, D decoder 14 and V decoder 15. A bit/sense and driver selector 19 selects two out of three driver systems for each storage location accessed in accordance with the above three cases (a), (b) and (c). The D decoders 11 and 14 select one or more D drivers 16 in every dual-accessed operation. The V decoders 12 and 15 and H decoders 10 and 13 select one or more V drivers 17 or H drivers 18 (but not both types of drivers) during each operation. In case (b), where two accessed locations are in the same vertical column, the V driver 17 is selected; in case (a) where the accessed locations are in the same horizontal row; and in case (c) where there are "diagonally" (i.e., not in the same row or column) located, the H driver 18 is selected. For example, if the location 22 and location 21 in storage array 1 are accessed, [case (b) ] D drivers D4 and D2 will be selected together with V driver V2. As another example, if location 33 and location 03 are accessed, [case (a) ] the drivers D4, D6 and H3 are selected. If location 22 and location 03 are accessed, [case (c)] the D4, D6, H2 and H3 drivers are selected.

Once the driver lines to the storage array 1 have been selected, the next operation depends upon whether information is to be read from, or written into, the accessed location. In the case of a read operation, the sense amplifiers of V sense amplifiers and bit drivers 22 or the sense amplifiers of H sense amplifiers and bit drivers 25 which correspond to the unselected one of the drivers 17 and 18 sense information in the accessed locations. In the example where location 33 and location 03 are accessed, VG gating line 804 from bit/sense driver selector 19 connects location 33 and location 03 to positions VS3 and VS0 of the V sense amplifiers 22. OR-circuits 3 and 0 of OR-circuit 23 thus transfer the contents of locations 33 and 03 through the sense amplifiers 22 to the data registers 8 and 9 through the system selector 24. The system selector 24 associates the OR circuit of OR-circuit 23 with corresponding ones of the data registers 8 and 9. During writing, essentially the same operations occur, the information in data registers 8 and 9 being entered into the selected memory arrays through either bit drivers in V sense amplifiers and bit drivers 22 or bit drivers in H sense amplifiers and bit drivers 25. (In the example, writing is performed through the bit driver 22 positions VS3 and VS0.)

DETAILED DESCRIPTION

Figures 2A, 2B, 2C:
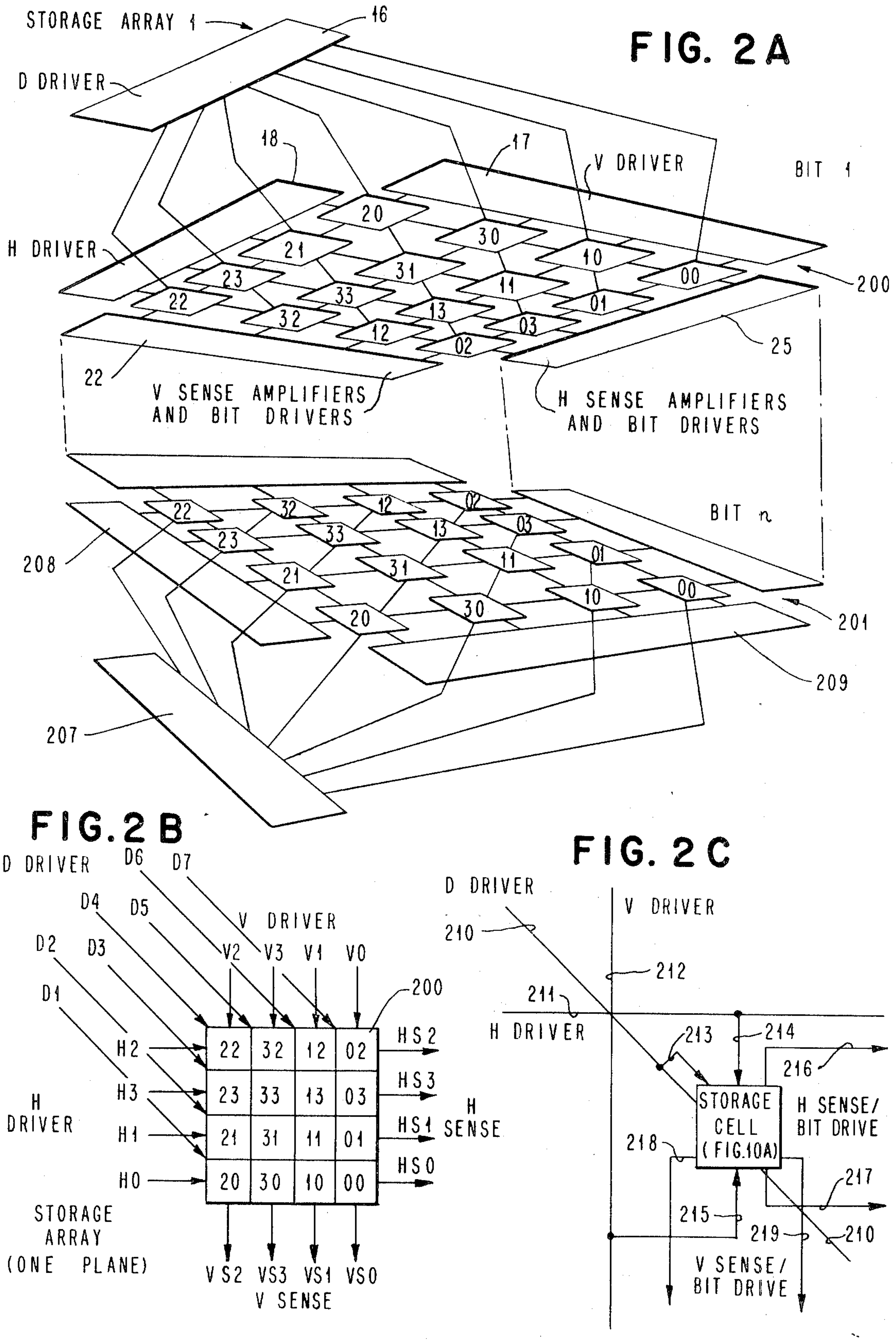
FIG. 2A is a three-dimensional view of a storage array.
FIG. 2B is a diagram showing the assignment of locations within the storage array of FIG. 2A.
FIG. 2C is a block diagram showing the wiring arrangement of a storage cell within the storage array of FIG. 2A.

Referring now to FIGS. 2A through 2C, the construction of an array utilizing the invention will be described. In FIG. 2A, the location of cells in storage array 1 is illustrated. The array comprises a number of planes, plane 200 representing the first bit 1 of every word in the array and plane 201 representing the last bit *n* of every word in the array. Each plane has a plurality of cells defined by three wires from drivers 16, 17 and 18. Wires from the diagonal driver 16 pass through each cell in plane 200 and a similar set of diagonal drivers (not shown) in the next plane pass through the same diagonals in the next plane and so on to D driver 207 for plane 201 representing the last bits in the words. The H driver 18 in plane 200 has a wire passing through each horizontal row of cells in plane 200 and similar H drivers (not shown) in successive planes have wires passing through corresponding rows of cells in those planes up to, and including, H driver 208 for plane 201. The V driver 17 has a wire for each vertical column in plane 200 and corresponding V drivers for other bits including bit *n*, represented by the V driver 209, have wires for each corresponding vertical column in the other planes. Since all the drivers are operated simultaneously, the operation of the entire array may be illustrated with reference to one plane. Referring now to FIG. 2B, each column in a typical plane 200 is represented by the left digit of two digits and each horizontal row is similarly represented by the right-hand digit, the two digits together forming a quarternary number. Wires connected to the horizontal and vertical drivers and the sense amplifiers and bit drivers are numbered to indicate their row and column positions. Diagonal wires are numbered successively from D1 through D7. Referring now to FIG. 2C, a typical memory call illustrates the connection of the foregoing wires. The driver wires 210, 211 and 212 passing through each cell position are connected to the cells by wires 213, 214 and 215. Each cell is also connected to H wire pairs 216 and 217 and V wire pairs 218 and 219 used for reading and writing.

Figure 3A:
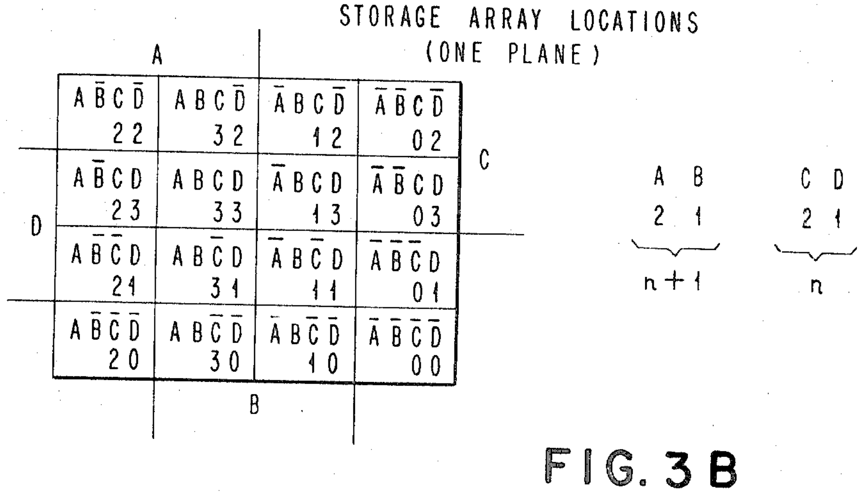
FIG. 3A illustrates the storage location convention used.
Figure 3B:
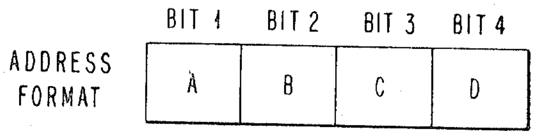
FIG. 3B is a diagram showing the address format.
Figure 3C:
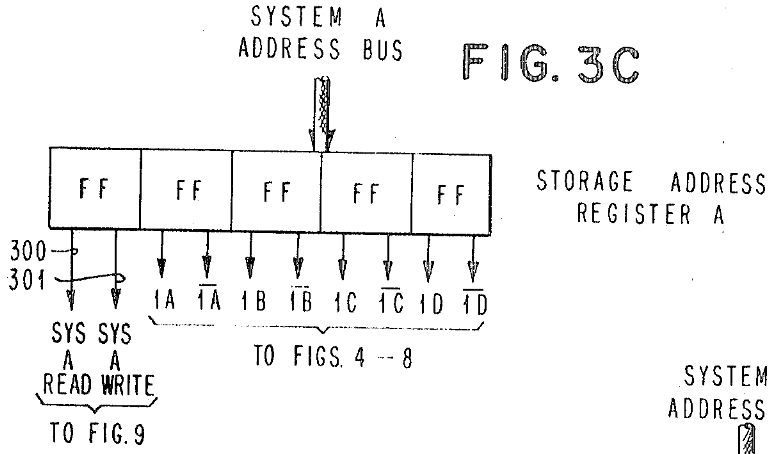
FIGS. 3C and 3D are diagrams showing the storage address registers.
Figure 3D:
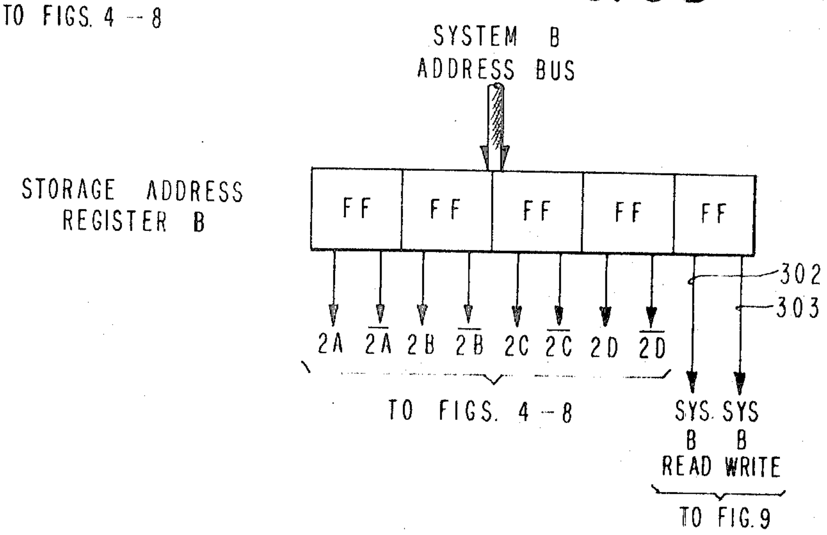

The addressing convention is shown in FIG. 3A. Sixteen words are stored at locations designated, in a well-known manner, by letters A, B, C and D. By weighting the letters *n* and *n*+1, as shown, binary representations of an address (such as 1010) can be interpreted as a binary-coded quarternary BCQ number expressed in decimal digits (for example: 22). Referring to FIGS. 3B–3D, addresses are represented by a four-bit BCQ number which is supplied to storage address register A and storage address register B along with a read or write control signal, each constructed of five flip-flops which indicate by their outputs the presence or absence of corresponding input bits.

Figure 4:
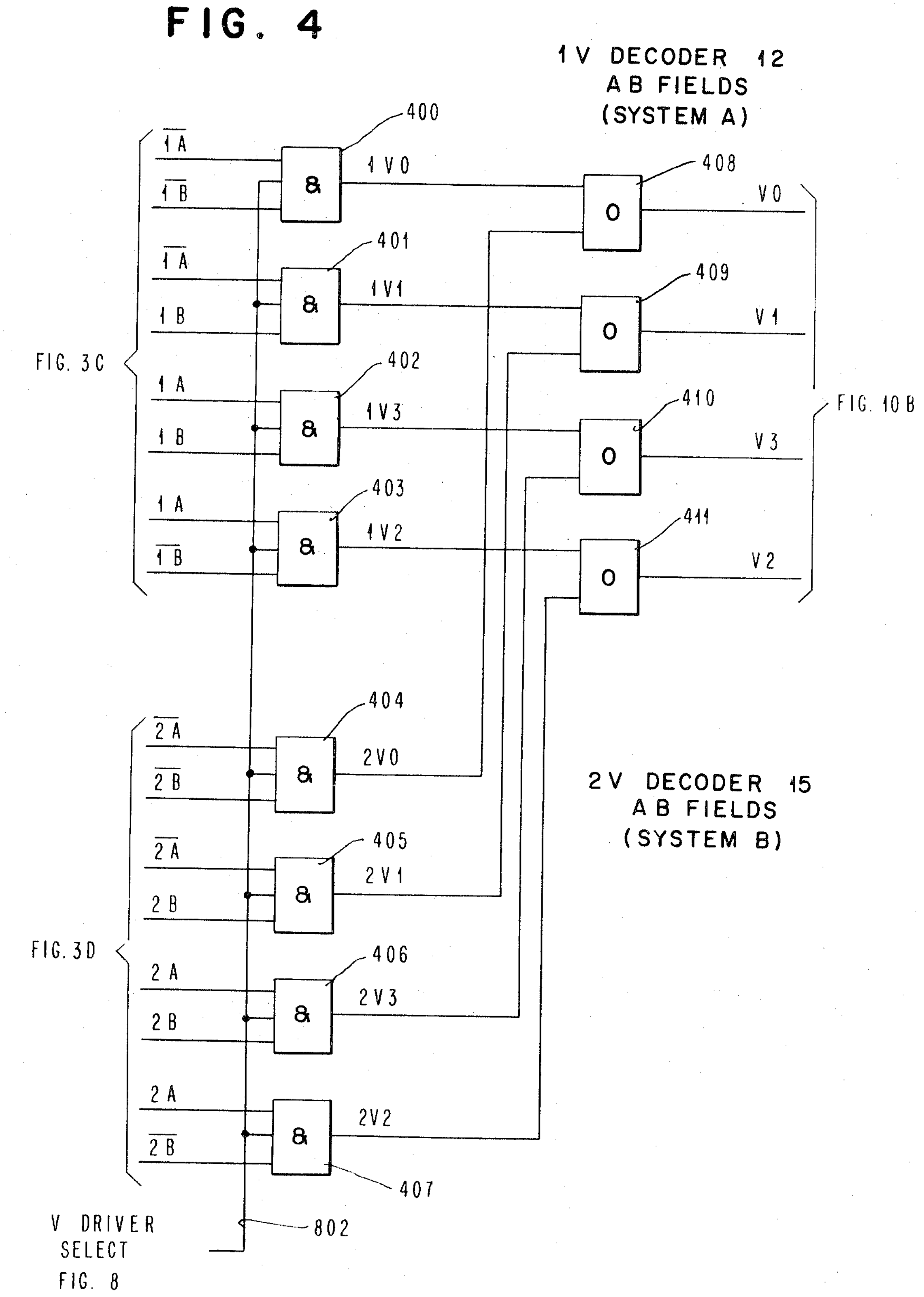
FIG. 4 is a logic diagram showing the vertical decoders.

Referring now to FIG. 4, the vertical decoders 12 and 15 will be described. The V decoder monitors the A and B (column) positions of the addresses on buses 2 and 3. When gated by a signal on line 802, AND-circuits 400 through 403 monitor the A and B positions of the addresses in the storage address register A and AND-circuits 404 through 407 monitor the A and B positions in the storage address register B. If either, or both, of the buses specify a location, one, or more, of the drivers V0 through V3 will be activated by one, or more, of OR-circuits 408 through 411 because each one of the AND-circuits 400 through 407 monitors a different combination of the A and B signals from buses 2 and 3.

Figure 5:
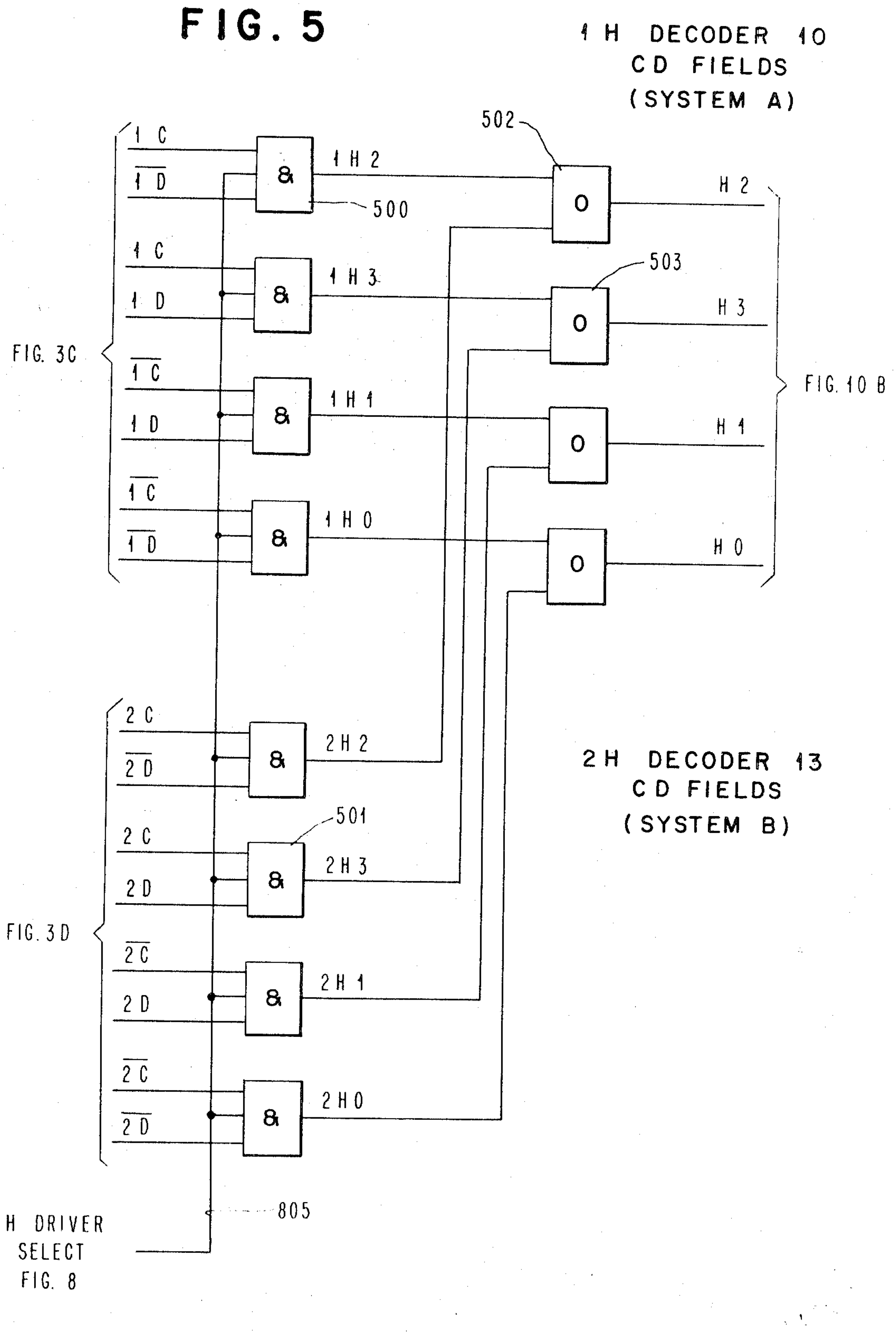
FIG. 5 is a logic block diagram showing the horizontal decoders.

Referring to FIG. 5, a logic diagram of the H decoders 10 and 13 is shown. Upon the occurrence of a signal on line 805, the H decoders operate in the same manner as the V decoders just described with the exception that the C and D (row) positions of the addresses on the address buses 2 and 3 are monitored and that the outputs on lines H0, H1, H2 and H3 indicate H drivers to be selected in accordance with rows specified by the C and D positions. If the addresses on the address buses 2 and 3 fall in different rows, two of the horizontal H drivers will be selected and if the buses specify locations which fall in the same row, the corresponding one of the drivers H0, H1, H2 and H3 will be selected.

Referring to FIGS. 6A through 6C and 7, the diagonal decoders 11 and 14 will now be described. Beginning with the diagonal decoder 11, positions A, B, C and D of the bus 2 are monitored and translated into a signal on one of the diagonal drive lines D1 through D7. The translation, which follows well known rules, is implemented by AND-circuits 600 through 615 which each monitor one of the 16 possible values represented by signals at positions A, B, C and D. With reference to FIG. 2B, it can be seen that the diagonal D1 passes only through location 20 (represented by the code $A\overline{BCD}$) and that diagonal D4 passes through locations 22, 33, 11 and 00. Taking these two illustrations, AND-circuit 600 has an output 1D1 when location 20 is addressed. AND-circuits 606 through 609 have outputs resulting in an output 1D4 from OR-circuit 618 when one, or more, of locations 22, 33, 11 or 00 is addressed. The OR-circuits 621 through 627 pass the signal representing the decoding of diagonals for decoder 11 to corresponding drive lines D1 through D7 and also receive corresponding outputs from decoder 14 in FIG. 7.

Figures 6A, 6C:
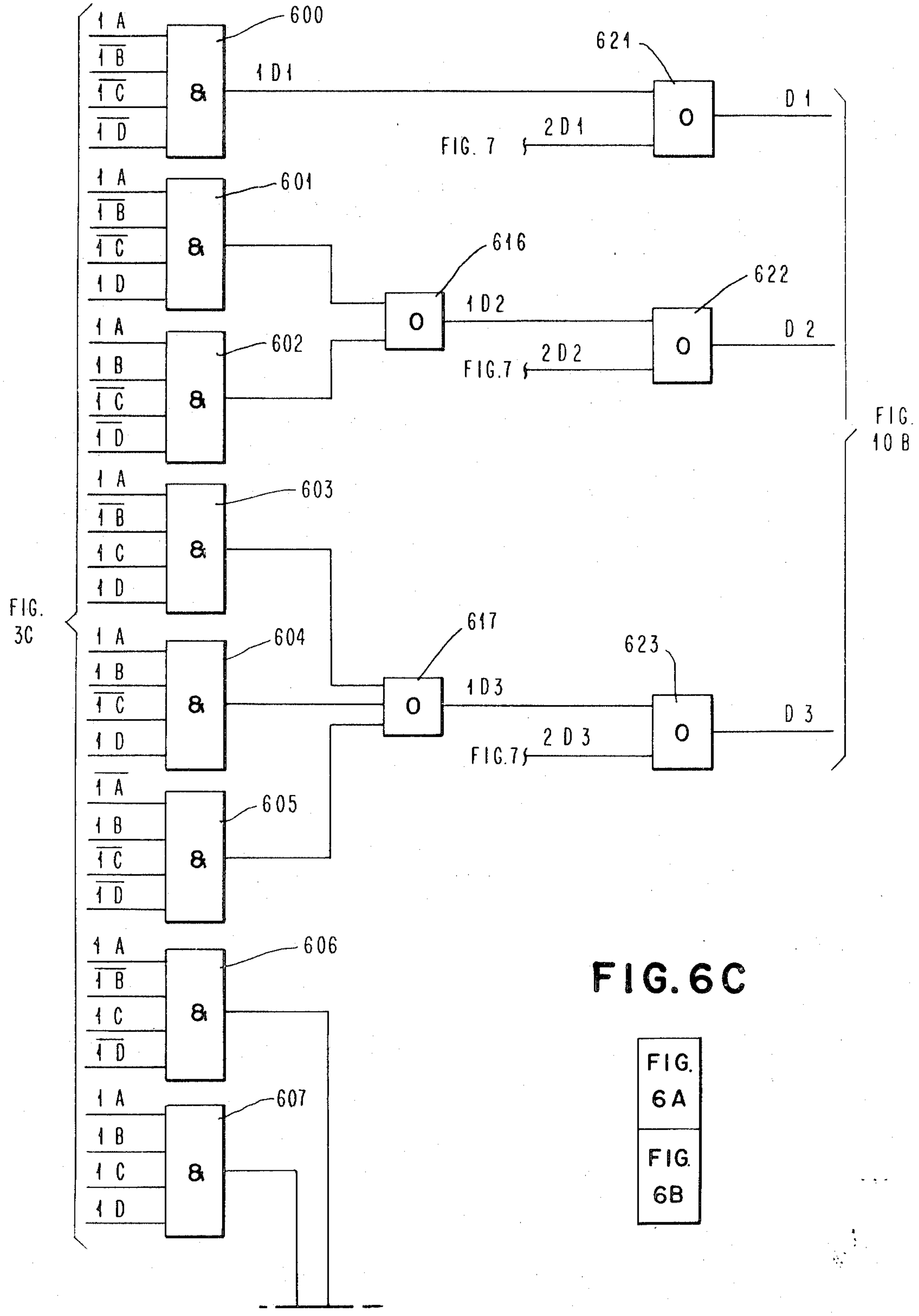
FIGS. 6A through 6C and 7 are logic diagrams showing the diagonal decoders.
Figure 6B:
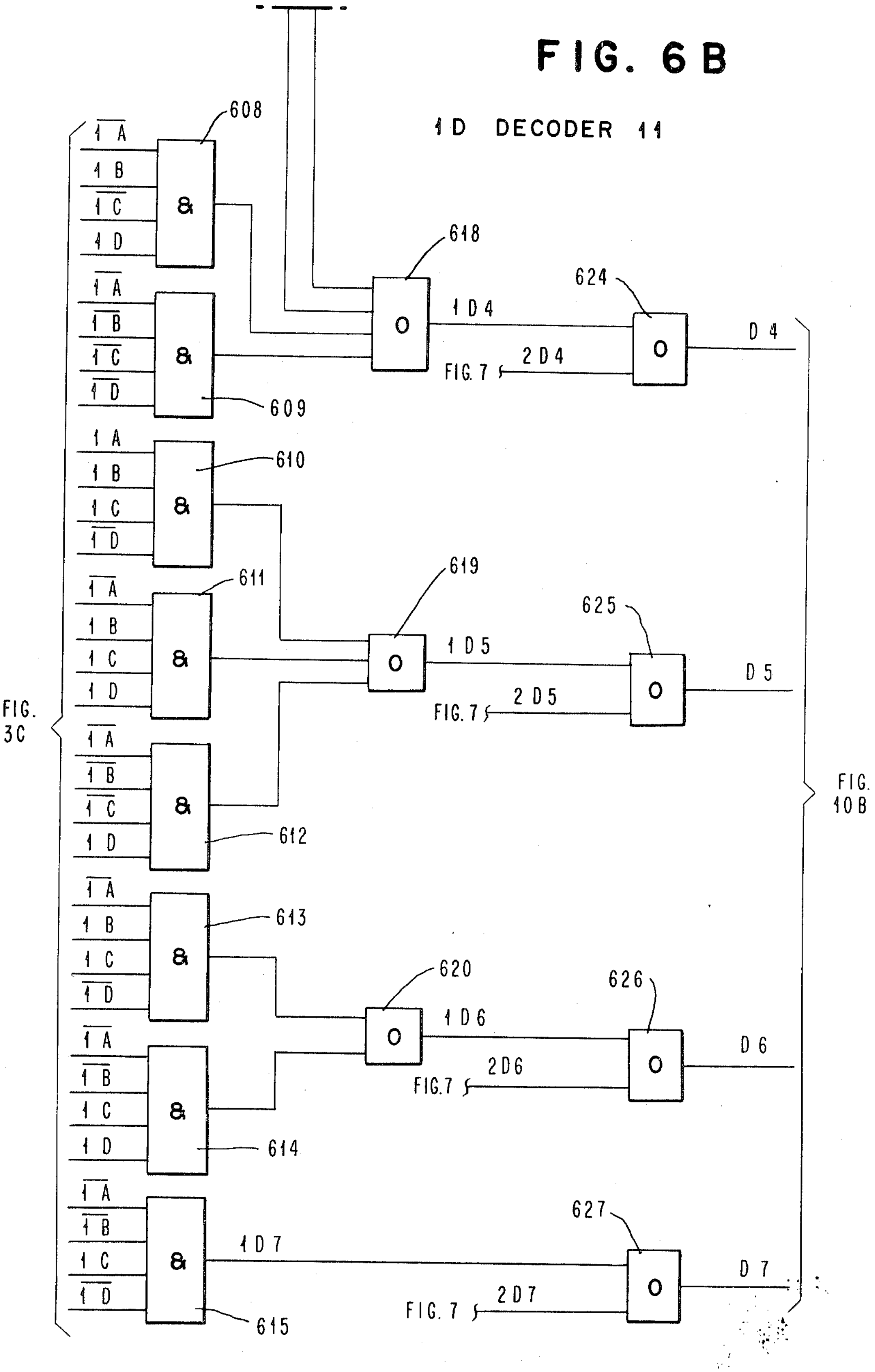
Figure 7:
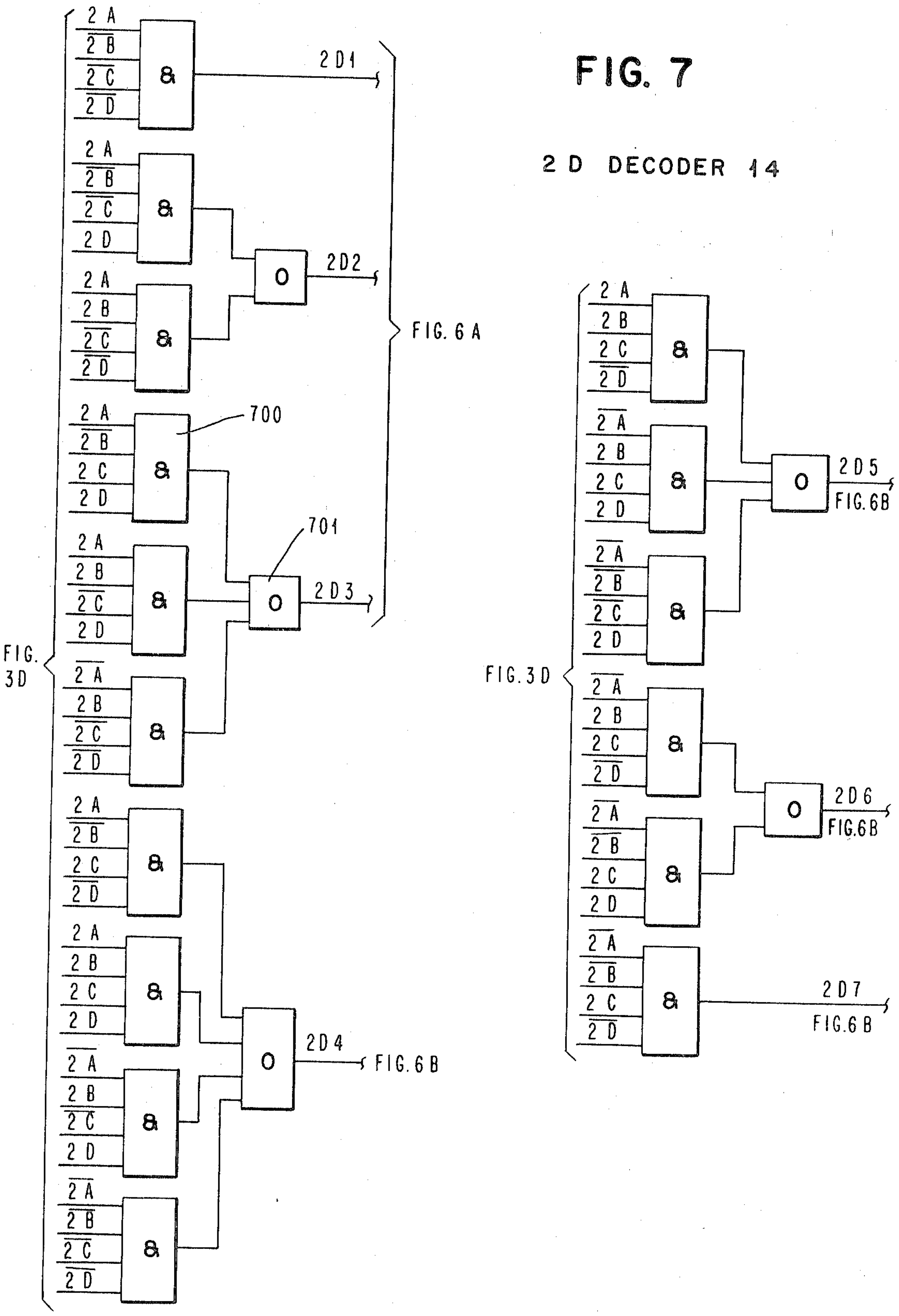

Referring now to FIG. 7, the decoder attached to the storage address register B operates identically to the decoder 11 except that its outputs are connected to the OR-circuits 621 through 627 in FIGS. 6A through 6C to supply signals on lines D1 through D7.

Figures 8A, 8B:
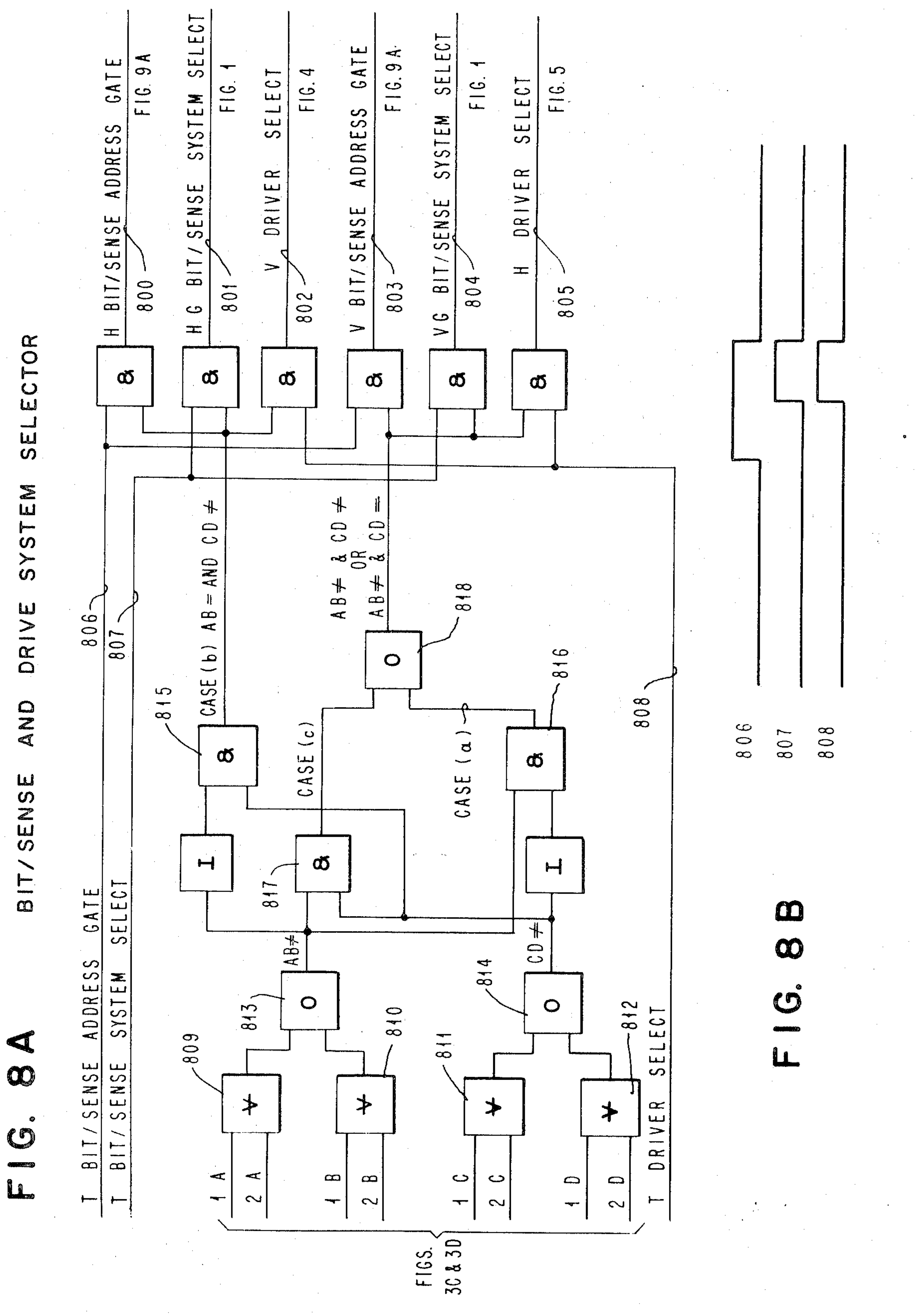
FIG. 8A is a logic block diagram of the bit/sense and drive system selection and FIG. 8B illustrates timing signals available thereto.

The bit/sense and drive system selector will now be described with reference to FIGS. 8A and 8B. It is necessary to control the selection of the various drivers, sense amplifiers and bit drivers as a function of the relative positions of the addressed locations. In case (b), where the two accessed locations are in the same vertical column (and therefore have the same AB value), control signals select the diagonal and vertical drive wires and the horizontal sense amplifiers and bit drivers. In cases (a) and (c), where the accessed locations do not fall into the same column, that is they are either in the same row or not in the same row or column, control signals select the diagonal and horizontal drive wires and the vertical sense amplifiers and bit drivers. EXCLUSIVE OR-circuits 809 through 812 decode addresses in the storage address registers 8 and 9 indicating any inequalities between the corresponding A and B values at the output of OR-circuit 813 and inequalities between C and D at the output of OR-circuit 814. Cases (a), (b) and (c) are indicated by signals from AND-circuits 815, 816 and 817 respectively. OR-circuit 818 supplies a signal wherever either case (a) or (c) occurs. Externally available signals, generated in a manner well known in the art, are available at times illustratively shown in FIG. 8B. Signals therefore appear at the output of FIG. 8A in accordance with the following table.

TABLE

| Input: | Case a or c | Case b |
|---|---|---|
| 806 bit/sense address gate | 803 | 800 |
| 807 bit/sense system select | 804 | 801 |
| 808 driver select | 805 | 802 |

Figure 9A:
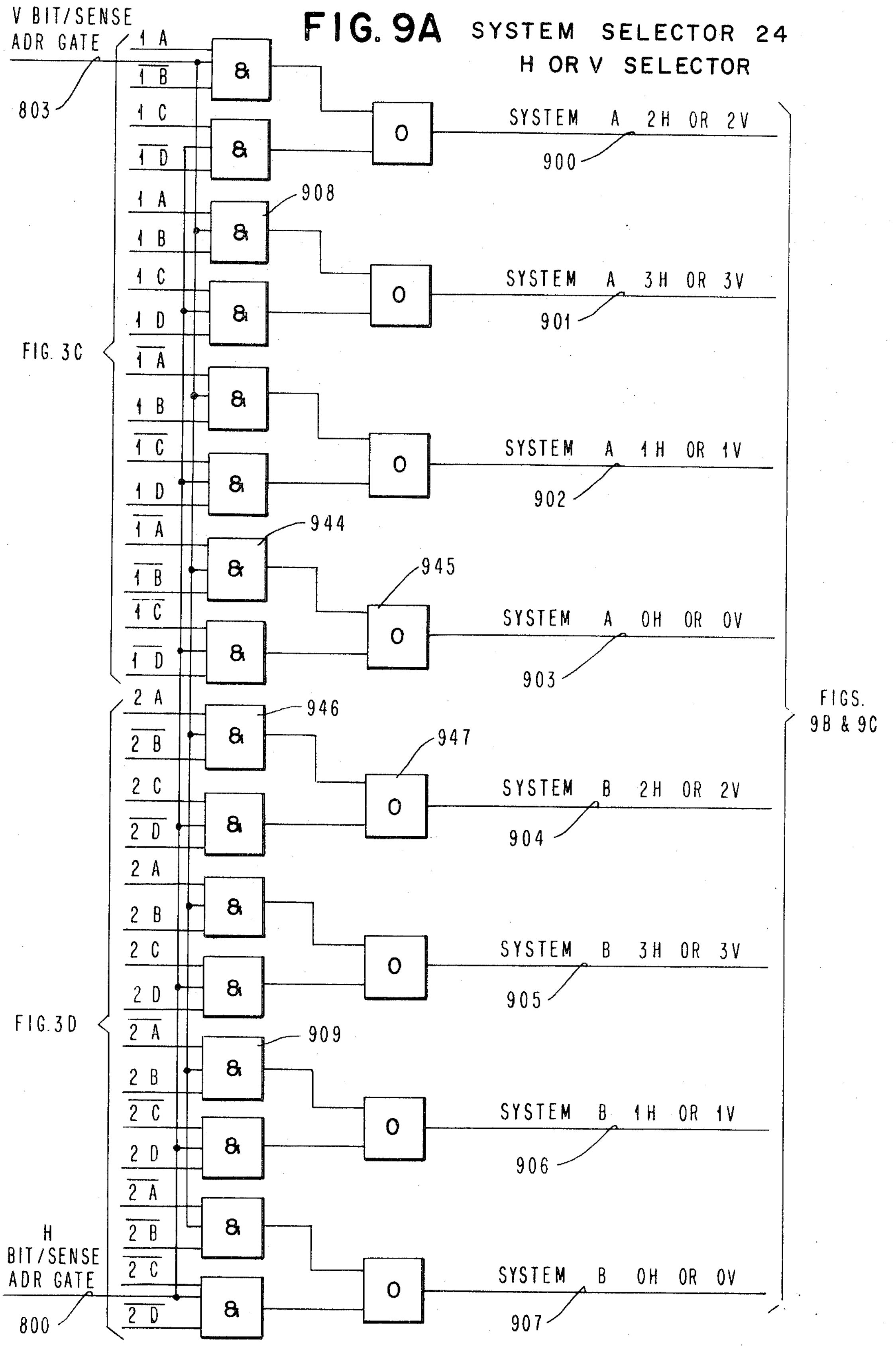
FIG. 9A shows the H or V selector system selector in logic diagram form.
Figure 9B:
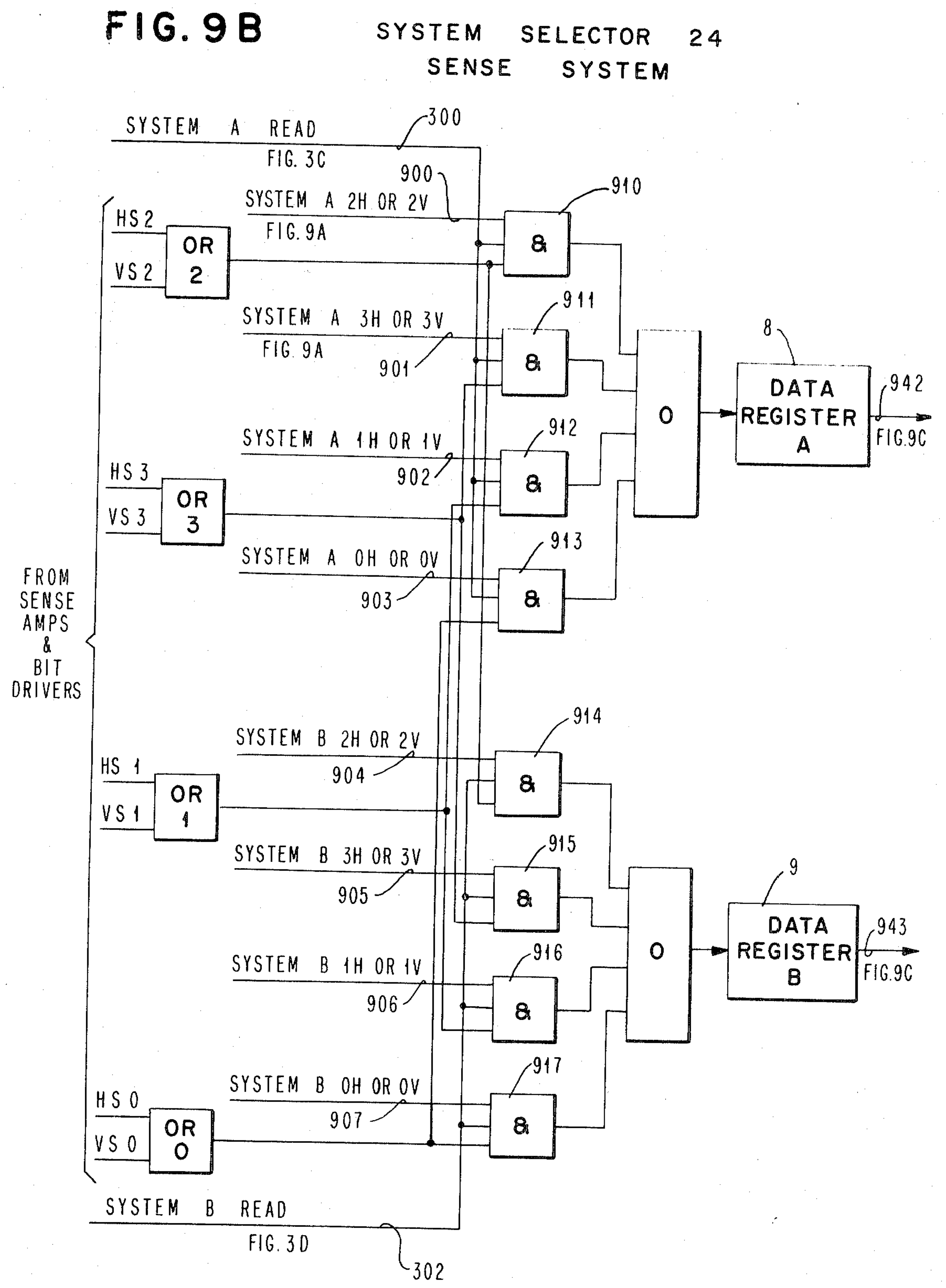
FIG. 9B shows the sense system systems selector in logic diagram form.
Figure 9C:
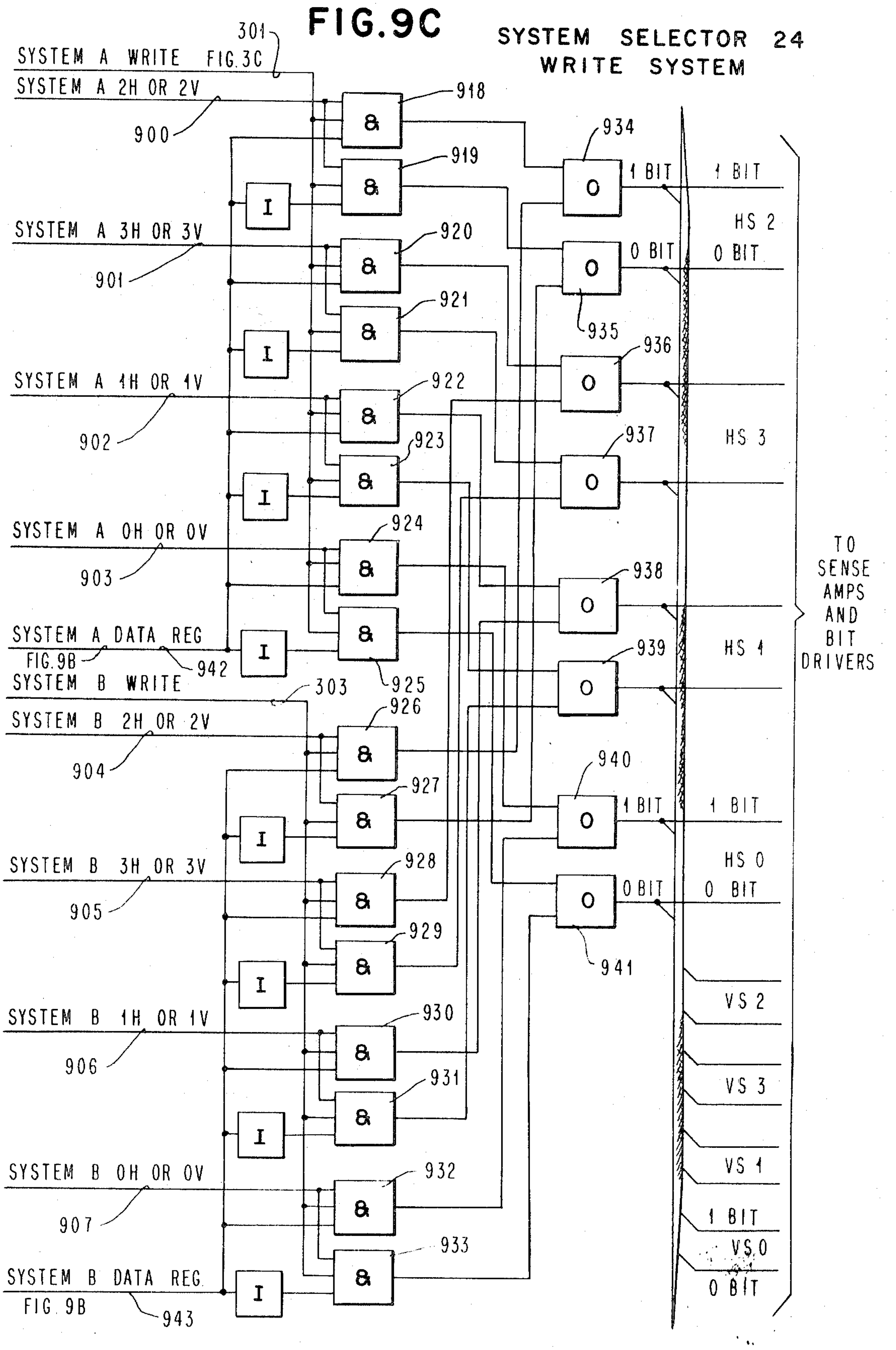
FIG. 9C shows the write system systems selector in logic diagram form.

Referring now to FIGS. 9A, 9B and 9C, the system selector 24 will now be explained. The system selector relates the two of the four OR-circuits 23 with the proper ones of the data registers 8 and 9 for systems A and B, so that they communicate information corresponding to the addresses given to the storage array by the storage address registers A and B for systems A and B respectively. To fully understand the operation of the system selector 24 it is necessary to recall that the four sense amplifiers 22 are associated with particular rows, and that four sense amplifiers 25 are associated with particular columns in the array 1, depending upon the word locations addressed. If the word locations addressed are in the same row, [case (a)], then the sense amplifiers are associated with correspondingly numbered vertical columns. If the word locations are in the same column, [case (b)] then the sense amplifiers are associated with correspondingly numbered horizontal rows. Similarly, if the word locations are "diagonally" located, that is not in the same row or column, [case (c)] the sense amplifiers are associated with correspondingly numbered vertical columns. Thus, it is known, that if storage address bus 2 designated either a particular row or a particular column, the information will enter the like numbered one of the OR-circuits 23. For example, if the storage address bus 2 specified a word at location 32 (column V3 row H2), the information stored at that location could be found in either sense amplifier HS2 or sense amplifier VS3. The choice of whether it will be in section 2 or 3 of OR-circuits 23 is determined by the address on the other storage address bus 3. If it specifies an address indicating a word located at 12 (column V1 row H2), (that is, in the same row as the words specified by the other bus) the sense amplifiers attached to the vertical columns V1 and V3 will be selected and the information contained in locations 32 and 12 will be sent through the sense amplifiers 22, OR-circuits 1 and 2 and gated through into data registers A and B respectively.

Referring to FIG. 9A, the horizontal rows and vertical columns specified by addresses in the storage address registers 8 and 9 are identified by signals on lines 900 through 903 and 904 through 907 respectively. In cases (a) and (c), the signals indicate that vertical drivers are utilized for information communication and in case (b), the signals indicate the use of horizontal drivers. For example, if locations 32 and 12 are accessed, [case (a) ] by addresses in storage address registers 8 and 9 respectively, a signal on line 803 operates AND-circuits 908 and 909 to indicate on line 901 that the system A address activated the 3V driver, and on line 906 that the system B address activated the 1V driver.

As shown in FIG. 9B, during reading the OR-circuits 23 information may be passed into either data register 8 or data register 9 depending upon which one of AND-circuits 910 through 917 is selected. Thus, OR-circuit 3 is gated to data register 9 if AND-circuit 915 is selected and is gated to data register 8 if AND-circuit 911 is selected. One AND-circuit must be selected out of each of the two groups 910 to 913 and 914 to 917 to connect the OR-circuits 23 to the data registers 8 and 9. Two AND circuits, one in each group, are selected by a coincidence of inputs from the system control lines system A read 300 and system B read 302 and two of the lines 900 through 907. In the example where locations 32 and 12 are accessed for reading by the storage address registers for systems A and B, respectively, there will be signals on lines 300, 302, 901 and 906, operating AND-circuits 911 and 916 to connect the third OR of OR-circuits 23 to data register A and the first OR circuit of OR-circuits 23 to data register B.

Referring to FIG. 9C, during writing operations, data registers 8 and 9 for systems A and B are connected by the systems selector 24 to the locations specified by the storage address register for systems A and B respectively. One pair of AND circuits in each of groups 918 to 925 and 926 to 933 is selected by signals on one or both of system write lines 301 and 303, one of lines 900 to 903 and one of lines 904 to 907. If data register A contains a 1–bit, the selected one of AND-circuits 918, 920, 922 and 924 gates the 1–bit via the connected one of the OR-circuits 934, 936, 938 and 940 to the sense amplifiers and bit drivers 22 and 25. If the data register A contains a 0–bit, AND-circuits 919, 921, 923 and 925 and OR-circuits 935, 937, 939 and 941 are used. Data register B similarly operates through AND-circuits 926 to 933 and OR circuits 934 to 941.

Figure 10A:
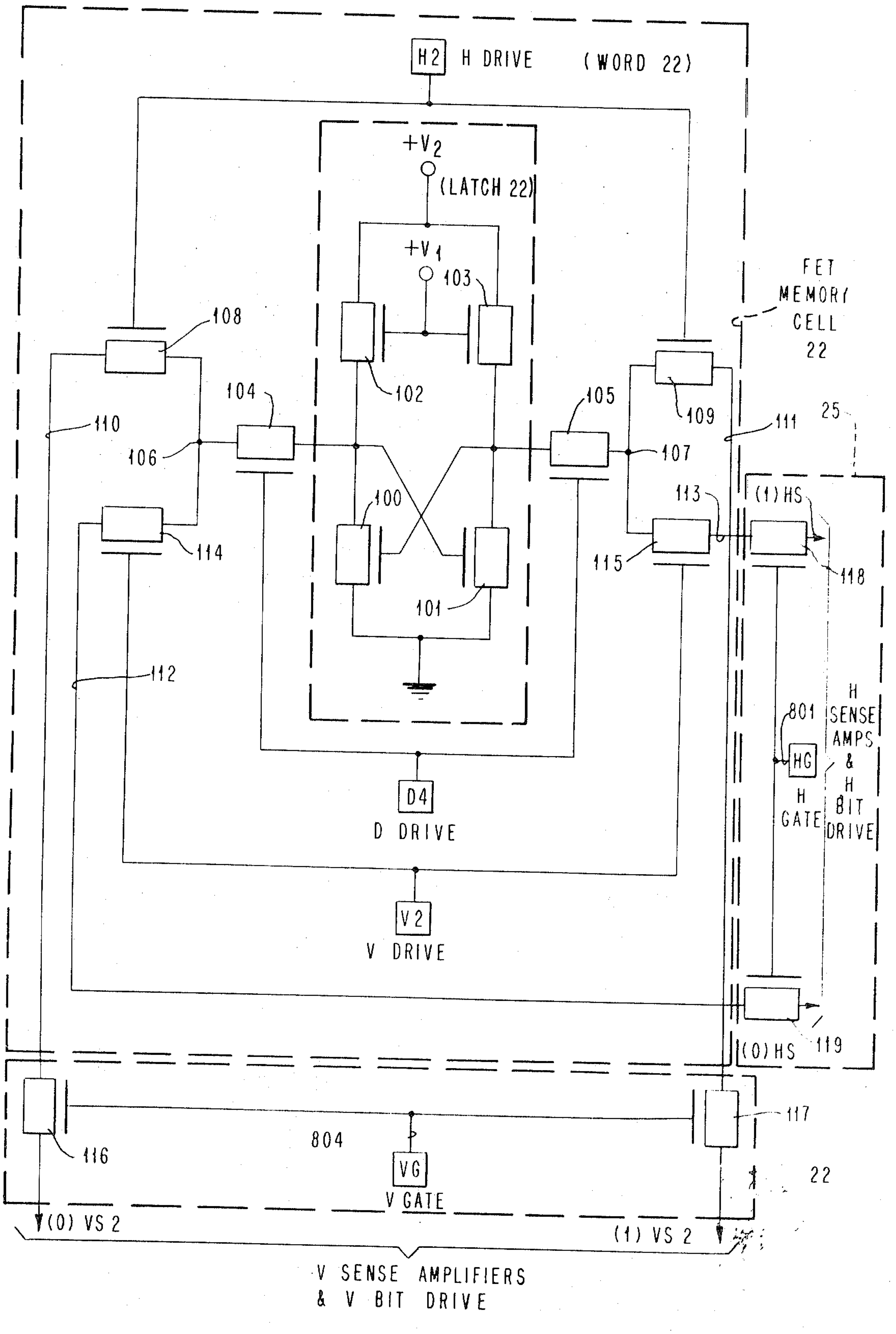
FIG. 10A is a schematic showing a storage cell.
Figure 10:
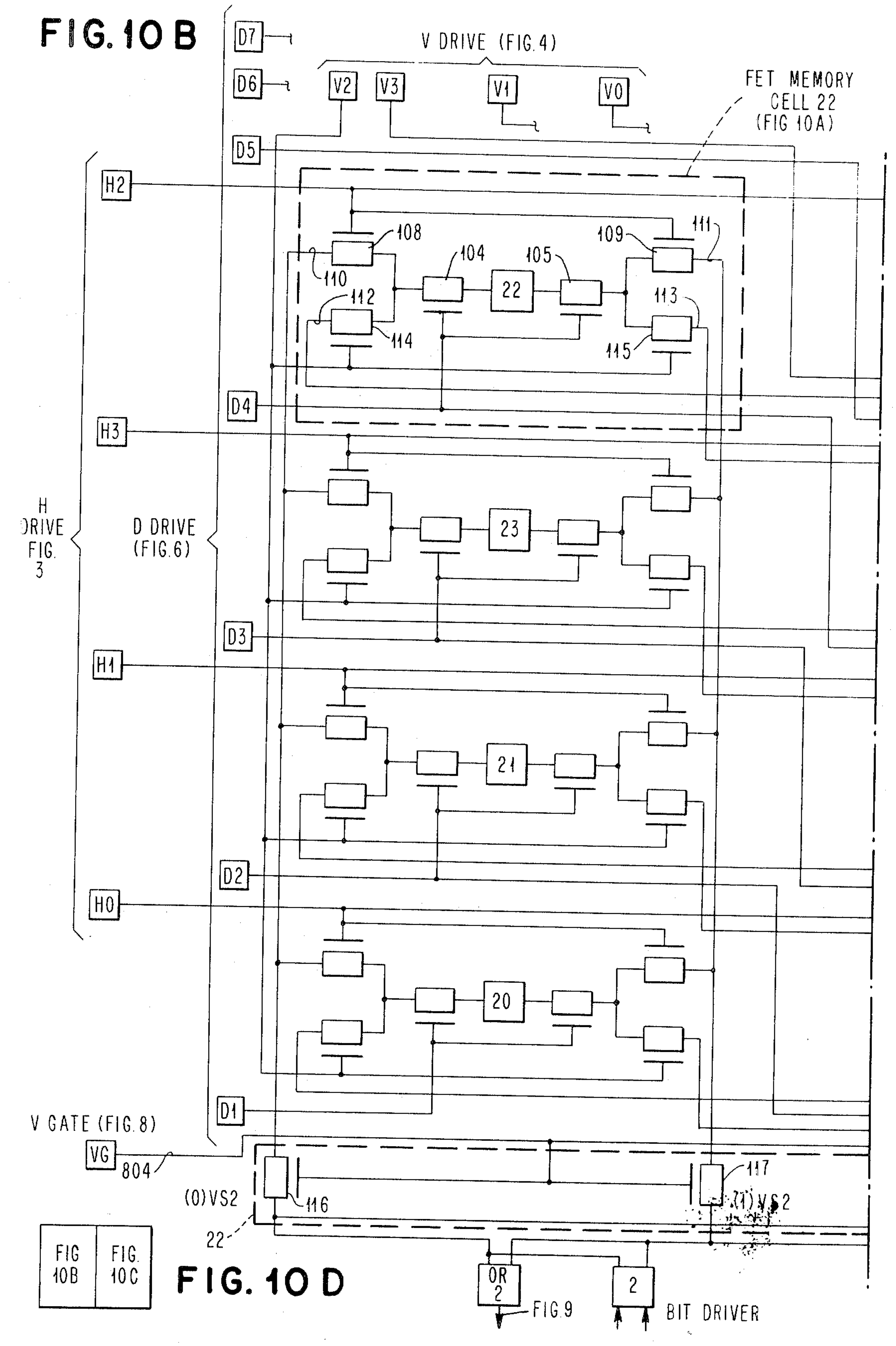
FIGS. 10B through 10D form a schematic diagram illustrating a storage plane.

A typical FET storage cell will be explained with reference to FIG. 10A and a configuration of an array of such storage cells will be explained with reference to FIGS. 10B through 10D. FIG. 10A shows an illustrative single-bit storage cell in word 22 selected by two of three coordinates H2, V2 and D4 for reading or writing access to its contents by either of two pairs of sense wires (0)HS2 and (1)HS2 or (0)VS2 and (1)VS2. The cell includes a latch for word 22 and is associated with V sense amplifiers and V bit drivers 22 and H sense amplifiers and H bit drivers 25, sections VS2 and HS2. When selected by drive signal D4 and either one of drive signals H2 and V2, the latch may be sensed, set or reset by signals on the pair of sense wires operated by a gate signal VG on line 20 or HG on line 21.

The symbols in the circuit of FIG. 10A each represent a field effect transistor in accordance with well-known terminology shown, for example, in a patent application of J. W. McDowell, entitled "Pulse Powered Data Storage Cell," Ser. No. 641,223, filed May 25, 1967 (Docket P0–9–66–033) and assigned to International Business Machines Corporation and in the cross-referenced application entitled "Semi-conductive Cell For A Storage Having a Plurality of Simultaneously Accessible Locations" (Docket P0–9–69–042). Other transistor types or circuit elements may be used. Transistors 100 through 105 form a gated latch data storage cell of the type described in the aforementioned prior art. When a D drive signal D4 is applied, the latch may be sensed, set and/or reset by the application of appropriate signals, at points 106 and 107. As explained in the cross-referenced "Semi-Conductive Cell For A Storage Having A Plurality of Simultaneously Accessible Locations" (Docket P0–9–69 –042) the prior art circuit has been improved for the purposes of this invention to permit accessing via lines 110 and 111 upon activation of transistors 108 and 109 by an H drive signal H2 and accessing via lines 112 and 113 upon activation of transistors 114 and 115 by a V drive signal V2. Lines 110 through 113 connect to external devices by means of additional transistors 116 through 119, provided for each row and column of latches, which are activated in mutually exclusive pairs by either the V gate line VG or the H gate line HG. Transistor pairs 116 and 117 and 118 and 119 act as gates to differential sense amplifiers during reading and bit drivers during writing, the direction of applied potential during writing determining whether the latch is set to the one state or reset to the zero state.

Figure 10C:
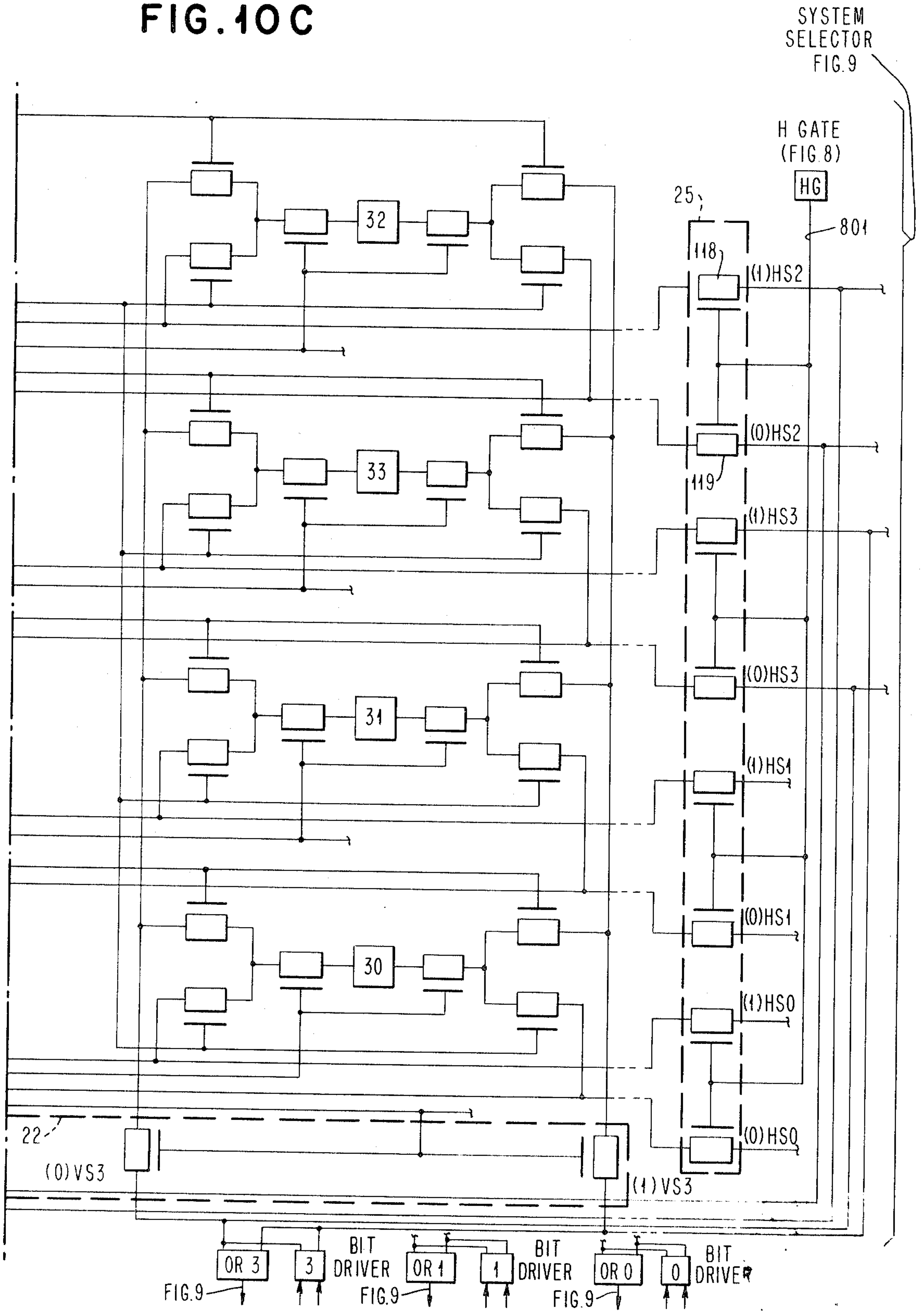

Referring now to FIGS. 10B through 10D, the storage cell for bit 22 is shown, together with other bits representing the first bit of each of the words in the first plane of the storage array. The horizontal drive wire H2, in addition to being connected to transistors 108 and 109 of cell 22, is connected to corresponding transistors in cells 32, 12 (not shown) and 02 (not shown). The vertical wire V2, in addition to being connected to transistors 114 and 115 of cell 22, connects to corresponding transistors in cells 23, 21 and 20. The diagonal line D4, in addition to being connected to transistors 104 and 105 of cell 22, connects to corresponding transistors in cells 33, 11 (not shown) and 00 (not shown). The wires 112 and 113 are connected to transistors 118 and 119 (and then to H sense amplifiers and bit drivers 25) to which are also connected corresponding wires from all other cells in the horizontal row H2. Similarly, wires 110 and 111 are connected to transistors 116 and 117 (and then to V sense amplifiers and bit drivers 22) to which are connected corresponding wires from all other cells in the same vertical column V2. The transistors 116 and 117, and corresponding transistors in other vertical columns, are gated to the sense amplifiers and bit drivers 22 by a signal VG on the vertical gate line 804 while the transistors 118 and 119 and corresponding pairs of transistors for other horizontal rows, are gated to the sense amplifiers and bit drivers 25 by an HG signal on the horizontal gate line 801. OR-circuits 23 sections 0, 1, 2 and 3 are connected to both the horizontal and vertical pairs HS and VS for reading and HS and VS line pairs receive information from the data registers during write operations.

EXAMPLE OF OPERATION

The operation of the invention during reading will now be described with reference to all of the figures for the case where system A supplies the address $\overline{ABCD}$ (0010) on bus 2 for reading into bus 4 the contents of location 02 and system B supplies the address $A\overline{B}CD$ (1011) on bus 3 for writing into location 23 data on bus 7. The relationship of the coding and locations is shown in FIGS. 3A through 3D where the address format $\overline{ABCD}$ indicates word location 02 and $A\overline{B}CD$ indicates word location 23. The address format as shown in FIG. 3B is stored in the storage address registers of FIGS. 3C and 3D. Utilizing the rules previously given, reference to FIG. 2B shows that for case (c), word location 02 requires that lines D7 and H2 be driven and VS0 sensed for reading and that word location 23 requires that lines D3 and H3 be driven and VS2 activated for writing.

Referring to FIG. 1, the signals 0010 on system A bus 2 and 1011 on system B address bus 3 are made available to all of the decoders 10 through 15. Referring to FIGS. 8A and 8B and the table, for bit/sense and drive system selection, since AB and CD for both systems are not equal [case (c)], H drives 805, VG bit/sense 804 and V bit/sense address gates 803 are selected. Referring to FIG. 5, the signals on lines $\overline{CD}$ and CD operate AND-circuits 500 and 501 and, thus, OR-circuits 502, and 503 to cause outputs on lines H2 and H3. Referring to FIGS. 6A through 6C, the signals on lines $\overline{ABCD}$ supply all the inputs of AND-circuit 615 causing OR-circuit 627 to place a signal on diagonal wire D7. In FIG. 7, signals on lines $A\overline{B}CD$ supply all the inputs of the AND-circuit 700 to supply a signal to OR-circuit 701 and cause an output signal on line 2D3 which is, in FIG. 6, applied to OR-circuit 623 to place a signal on the diagonal line D3. Referring to FIGS. 10B through 10D, the following drive lines are activated; H2, H3, D3, D7 and VG. Signal VG on line 804 causes the transistors 116 and 117 in section VS2 and other corresponding transistors in sections VS3, VS1 and VS0 of the V sense amplifiers and bit drivers 22 to be selected. In FIGS. 10B through 10D, using the typical circuit of FIG. 10A as a reference, the transistors of cells 02 and 23 (corresponding to the transistors 108 and 109 and 104 and 105 in the cell 22 shown in FIG. 10A) are selected by lines H2 and D7 and H3 and D3, connecting the latch portion of cells 02 and 23 to the vertical select line pairs, (0)VS0 and (1)VS0, and (0)VS2 and (1)VS2.

Referring to FIG. 1, the selection of the drivers and the operation of the memory array 1, as just described, has caused accessing of locations 02 and 23 and the availability of their contents to the V sense amplifiers and bit drivers 22 sections VS0 and VS2 which transfer the information in these locations. The system selector 24 relates lines VS2 and VS0 to that one of the data registers 8 and 9 which is assigned to the same system as the address which resulted in the accessing of its related location. Referring to FIG. 9A, the system selector 24 monitors both the addresses on the buses 2 and 3. The address on bus 2 and the signal on line 803 causes activation of AND-circuits 944 which, via OR-circuit 945, supplies a signal on line 903 to AND-circuit 913 in FIG. 9B which is selected by a signal on line 300. The AND-circuit 913 connects OR-circuit 23 section 0 to data register 8. Since location 02 was specified by the address supplied by system A on bus 2, the contents of location 02 are entered into system A data register 8 via OR-circuit 23. Similarly, monitoring of the address information on bus 3 results in activation of AND-circuits 946 in FIG. 9A which transmits a signal on line 904, via OR-circuit 947, to activate one leg of AND-circuits 926 and 927 which are selected by a signal on line 303. AND-circuit 914 connects data register 9 for system B with location 23 via OR circuits 934 and 935 permitting the data register contents to be entered into the location (specified by system B) on lines (0)VS2 and (1)VS2. The addresses on the buses 2 and 3 have thus been properly related with the data on system data buses 4 and 7 connected to the data registers 8 and 9.

While the invention has been shown and described herein with reference to a preferred embodiment thereof, it will be understood by those skilled in the art that the foregoing and other changes in form and details may be made therein without departing from the spirit and scope of the invention.

What is claimed is:

1. A storage array, capable of having two multibit word locations simultaneously accessed by two different interrogators and providing independent signals to both interrogators, comprising:

a plurality of bistable storage circuits arranged in a number, equal to the number of bits in a word, of two-dimensional arrays, each circuit associated with three input lines and two output line sets and accessible by coincident activation of two of the input lines so that each of the bistable storage circuits may be simultaneously accessed by two different interrogators independently of one another and give separate output signals on the output lines without conflict;

three decoding and driving means, connected to the input lines, operable to activate aforesaid two lines at a time for each of the two different interrogators;

two sensing and driving means, connected to the output line sets, each selectable for simultaneously communicating information to the two different interrogators from two accessed locations; and means connected to said sensing and driving means for selecting one thereof.

2. The array of claim 1, wherein each circuit comprises a solid-state storage cell including a plurality of active devices cross-coupled to function as a flip-flop.

3. The array of claim 2, wherein each flip-flop comprises two active devices and there are provided two additional active devices associated with each line to function as gates upon activation of the associated line.

4. The array of claim 1, wherein each circuit is associated with a horizontal, vertical and diagonal line and the coincident activation of the diagonal line and a selected one of the horizontal and vertical lines permits communication of information with the circuit.

5. The array of claim 4, wherein each circuit comprises a solid-state storage cell, on a substrate containing a plurality of like cells, including a plurality of active devices and cross-coupled to function as a flip-flop.

6. The array of claim 5, wherein each flip-flop comprises two active devices and there are provided two additional active devices associated with each line to function as gates upon activation of the associated line.

* * * * *